June 29, 1926.
F. L. TODD
TIRE RIM
Filed Sept. 29, 1925
1,590,397
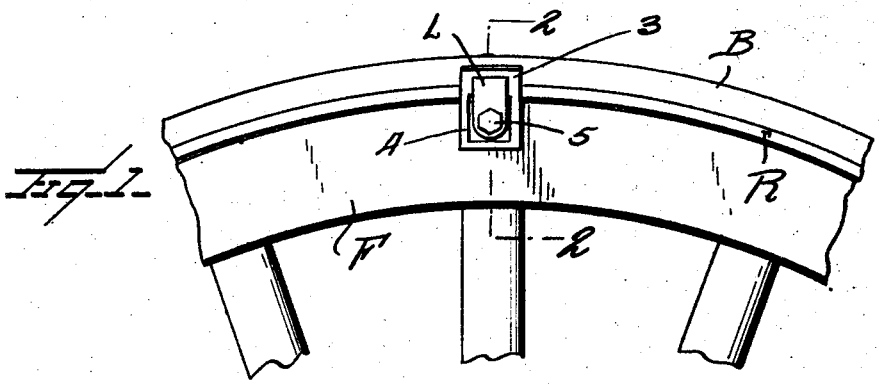
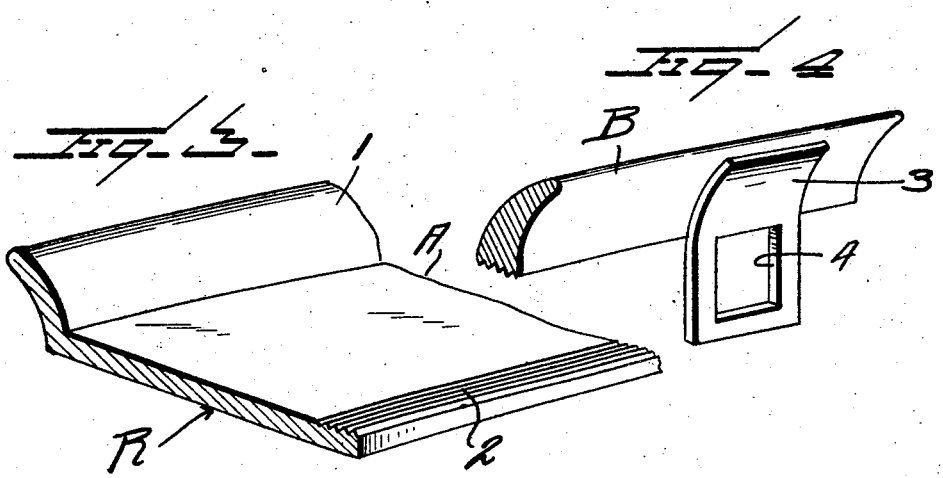
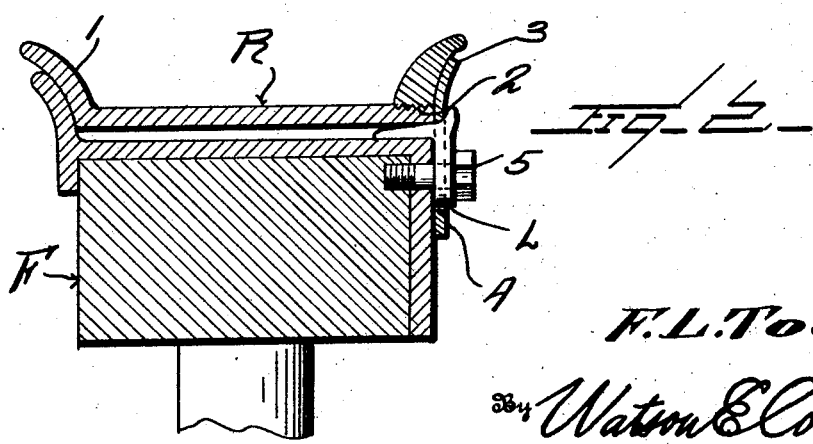
Inventor
F. L. Todd
By Watson E. Coleman
Attorney Patented June 29, 1926.

1,590,397

UNITED STATES PATENT OFFICE.

FREDERICK LEE TODD, OF MOBERLY, MISSOURI, ASSIGNOR TO HENRY SCHAFFER, OF CHICAGO, ILLINOIS.

TIRE RIM.

Application filed September 29, 1925. Serial No. 59,384.

This invention relates to certain improvements in tire rims and it is an object of this kind invention to provide a device of this kind wherein an inflated tire or the like may be readily and conveniently applied to the rim.

Another object of the invention is to provide a rim of this kind comprising a separate flange adapted to have threaded engagement upon the rim proper together with means carried by said flange to hold the same in applied position upon the rim proper and to maintain the assembled structure against creeping around the rim to which it is applied.

The invention consists in the details of construction and in the combination and arrangement of the several parts of my improved tire rim whereby certain important advantages are attained and the device rendered simpler, less expensive and otherwise more convenient and advantages for use, as will be hereinafter more fully set forth.

The novel features of my invention will hereinafter be definitely claimed.

In order that my invention may be the better understood, I will now proceed to decribe the same with reference to the accompanying drawings, wherein:—

Figure 1 is a fragmentary elevational view illustrating a rim constructed in accordance with an embodiment of my invention in applied position;

Figure 2 is a sectional view taken substantially on the line 2—2 of Figure 1;

Figure 3 is a fragmentary view in perspective of the rim proper;

Figure 4 is a fragmentary view in perspective of the separable flange coacting with the rim proper.

As disclosed in the accompanying drawings, F denotes the felly of a wheel upon which my improved rim R is adapted to be arranged. The rim R comprises the main section or body A and a removable or separable flange B. The section A constitutes the rim proper and is provided along one side margin with the flange 1 of any desired type and in accordance with the character of tire to be employed therewith. The opposite side marginal portion of the section or body A has its outer surface provided with the threads 2 with which is adapted to be engaged the separable or removable flange B, it being understood that the section A and the removable flange B are each annular in form but as this is thought to be clearly obvious to those skilled in the art such illustration is not deemed necessary.

The separable flange B is of such cross sectional configuration as the character of the tire requires.

Welded or otherwise secured to the outer face of the flange B is a plate 3 of a length to overlie a side face of the felly F, said plate 3 being provided with an opening 4 extending up to a point immediately adjacent to the flange B. This opening 4 provides means whereby a holding lug L of a type now generally employed may be disposed therethrough to hold my improved rim in applied position upon the felly F and also to hold my improved rim against creeping around the felly. The lug L, as herein disclosed, is secured in a conventional manner by the bolt 5 to the felly F. The opening 4 is of a size to substantially snugly receive the entire head of the lug L except the upper marginal lip or flange for coaction with the rim R.

While in the accompanying drawings there is illustrated only a single plate 3 and holding lug L, it is to be understood that in practice as many of these may be employed as best suits the requirements of practice. It is thought, however, that the present illustration is sufficient for the purposes of disclosure.

From the foregoing description it is thought to be obvious that a tire rim constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A demountable rim, a separable side flange threaded upon the rim, a plate fixed to the flange and extending inwardly of the flange a distance to overlie a side face of a wheel rim to which the rim may be applied, said plate being provided with an opening through which a rim lug is adapted to be disposed to hold the flange in applied position upon the rim and to hold the rim against creeping upon the felly, said opening in the plate being of a size to receive substantially the entire head of the rim lug and being entirely free of coaction with the rim.

In testimony whereof I hereunto affix my signature.

FREDERICK LEE TODD.